United States Patent [19]

Mizobata et al.

[11] Patent Number: 5,796,455
[45] Date of Patent: Aug. 18, 1998

[54] REFLECTIVE LCD HAVING A LIGHT SCATTERING MEANS FORMED ON AN ELECTRODE SIDE SURFACE OF A COUNTER SUBSTRATE

[75] Inventors: Eishi Mizobata; Hidenori Ikeno; Hiroshi Kanoh, all of Tokyo, Japan

[73] Assignee: NEC Corporation, Tokyo, Japan

[21] Appl. No.: 852,521

[22] Filed: May 7, 1997

Related U.S. Application Data

[62] Division of Ser. No. 661,898, Jun. 12, 1996.

[30] Foreign Application Priority Data

Jun. 13, 1995 [JP] Japan ................................. 7-146189

[51] Int. Cl.[6] ...................... G02F 1/1335; G02F 1/1333; G02F 1/1343
[52] U.S. Cl. .......................... 349/116; 349/113; 349/122; 349/143
[58] Field of Search ................... 349/112, 113, 349/122, 143

[56] References Cited

U.S. PATENT DOCUMENTS

| 4,266,859 | 5/1981 | Togashi | 349/112 |
| 5,283,675 | 2/1994 | Ooi et al. | 349/143 |
| 5,467,208 | 11/1995 | Kokawa et al. | 349/112 |
| 5,629,784 | 5/1997 | Abileah et al. | 349/112 |

FOREIGN PATENT DOCUMENTS 61-6390  2/1986  Japan .
5-5882   1/1993  Japan ................................. 349/112

OTHER PUBLICATIONS

T. Koizumi et al.; "Reflective Multicolor LCS (II): Improvement in the Brightness"; Proceedings of the SID, vol. 29/2, 1988, pp. 157–160.

S. Mitsui et al.; "Late–News Paper: Bright Reflective Multicolor LCDs Addressed by a–Si TFTs"; SID92 Digest, pp. 437–440.

N. Kimura et al.; "Development of Reflective Multicolor LCD"; Sharp Technical Report, No. 56, Jun. 1993, pp. 27–30.

*Primary Examiner*—William L. Sikes
*Assistant Examiner*—Toan Ton
*Attorney, Agent, or Firm*—Whitham, Curtis & Whitham

[57] ABSTRACT

In a reflective liquid crystal display comprising a first insulative plate having a reflector, a second insulative plate having a transparent electrode, and a liquid crystal layer sandwiched between the reflector and the transparent electrode, a convex-concave surface is provided at the side of the second insulative plate. With this arrangement, a desired light scattering characteristics is realized with a high image quality and a high brightness, with neither a fuzziness of displayed characters nor a double image. On the other hand, since no thin film transistor is formed at the side of the second insulative plate, the convex-concave surface can be simply formed with no necessity of depositing an insulating film covering the thin film transistor and patterning the deposited insulating film.

4 Claims, 14 Drawing Sheets

REFLECTIVE LCD HAVING A LIGHT SCATTERING MEANS FORMED ON AN ELECTRODE SIDE SURFACE OF A COUNTER SUBSTRATE

This is a Divisional Application of application Ser. No. 08/661,898 filed Jun. 12, 1996.

BACKGROUND OF THE INVENTION

1. Field of the Invention

The present invention relates to a reflective liquid crystal display.

2. Description of Related Art

A reflective liquid crystal display does not require a backlight as a light source, since it is so configured that an external incident light is reflected by a reflector plate provided in an inside of the liquid crystal display, and the reflected light is utilized as a light source for display. This has been considered to be an effective means capable of reducing a consumed electric power, of thinning the display and of lightening the display, as compared with a transparent type liquid crystal display. A reflective liquid crystal display commercially available at present is of a direct matrix drive STN (super twisted nematic) type.

However, the STN type reflective liquid crystal display does not have a satisfactory display characteristics in connection with a brightness and a resolution. Therefore, there has been considered an active matrix type configured to drive, by means of switching means such as thin film transistors or diodes, a liquid crystal of a TN (twisted nematic) type, a GH (guest-host) type, or a PDLC (polymer dispersed liquid crystal) type. In all these conventional reflective liquid crystal displays, a reflector is provided on an insulative plate located at a side opposite to an eye viewing side, and a transparent electrode is provided on an insulative plate at the eye viewing side. In addition, a convex-concave is formed at a reflecting surface of the reflector. With formation of the convex-concave reflecting surface, a light injecting onto the reflector is scattered, so that it is possible to prevent a face of a user and a background of the user from being reflected in a screen surface of the liquid crystal display.

Furthermore, the display performance greatly varies dependently upon the position of the reflector. In the STN type and the TN type which require a polarizer, since a polarizer has to be adhered on an outside surface of each of two insulative plates, the reflector is provided on an outside of the polarizer. As a result, a separation on the order of 0.2 mm to 1.1 mm corresponding to the thickness of the insulative plate, inevitably occurs between the reflector and an image displayed by the liquid crystal, so that a double image occurs, and therefore, when characters are displayed, a fuzziness of the displayed characters occurs. On the other hand, in the GH type and the PDLC type which require no polarizer, since the reflector is provided in an inside of the two insulative plates; it is possible to prevent the double image.

Referring to FIG. 1, there is shown a diagrammatic sectional view of a conventional GH type reflective liquid crystal display having the above mentioned structure.

As shown in FIG. 1, on a lower insulative plate 1, a switching device for an active matrix drive is formed, which is for example a thin film transistor (TFT) composed of a pair of source/drain electrodes 3 formed on the insulative plate 1, a doped layer 4 formed on an inner side of each of the source/drain electrodes 3, a semiconductor layer 5 formed on the insulative plate 1 between the pair of source/drain electrodes 3 and on each of the doped layer 4, a gate insulator film 6 formed on the semiconductor layer 5, and a gate electrode 7 formed on the gate insulator film 6.

Furthermore, a polyimide insulator film 15 is formed to cover the switching device as mentioned above and to cover the remaining portion of the lower insulative plate 1. This insulator film 15 has an convex-concave surface, in a region other than the switching device, and a pixel electrode 8 is formed on the convex-concave surface of the insulator film 15, and therefore, the pixel electrode 8 has a convex-concave surface corresponding to the convex-concave surface of the insulator film 15. The pixel electrode 8 is connected to one source/drain electrode 3 of the switching device through a contact hole 16 formed in the insulator film 15.

With the above mentioned structure, the pixel electrode 8 functions as a reflector having a convex-concave reflecting surface.

On an upper insulative plate 2, a common electrode 9 which is a transparent electrode, is formed, and a liquid crystal material layer 10 is sandwiched between the lower insulative plate 1 and the upper insulative plate 2. An image is viewed from a side of the upper insulative plate 2.

The convex-concave of the insulative film 15 is formed by a conventional photolithography or an exposure-and-etching process using a photosensitive insulative material. This technology is disclosed by for example, (1) Japanese Patent Publication No. JP-B-61-6390, (2) Tohru KOIZUMI and Tatsuo UCHIDA, "Reflective Multicolor LCD (II) Improvement in the Brightness", Proceedings of the SID, Vol. 29/2, pp. 157–160, 1988, (3) S. Mitsui et al, "23.6: Late-News Paper : Bright Reflective Multicolor LCDs Addressed by a-Si TFTs", SID 92 DIGEST, pp. 437–440, 1992, and (4) Naofumi KIMURA et al, "Development of Reflective Multicolor LCD", Sharp Technical Report, No. 56, pp. 27–30, June 1993. The disclosure of these publications is incorporated by reference in their entirety into this application.

As mentioned above, the conventional reflective liquid crystal display has been configured to form a convex-concave at the reflecting surface of the reflector, in order to scatter the incident light, thereby to prevent a user's face and its background from being reflected in the display screen of the liquid crystal display. However, in the case of forming a convex-concave on a plate on which an active device such as a TFT device or an MIM device is formed, it is necessary to deposit an insulating film covering the active device and to pattern the deposited insulating film so as to form a convex-concave surface. But, in the patterning process for forming the convex-concave surface, a fine control of a shape such as an inclined angle of the convex-concave is difficult, with the result that a sufficient light scattering cannot be obtained.

SUMMARY OF THE INVENTION

Accordingly, it is an object of the present invention to provide a reflective liquid crystal display which has overcome the above mentioned defect of the conventional one.

Another object of the present invention is to provide a reflective liquid crystal display having a desired light scattering characteristics, and therefore, a high image quality and a high brightness, with neither a fuzziness of displayed characters nor a double image.

The above and other objects of the present invention are achieved in accordance with the present invention by a reflective liquid crystal display comprising a first insulative plate having a reflector and a second insulative plate having a transparent electrode, the first and second insulative plates being assembled in such a manner that the reflector opposes to the transparent electrode, separately from each other, and a liquid crystal layer sandwiched between the reflector and the transparent electrode, wherein the reflector has a planar reflecting surface, and a transparent electrode side surface of the second insulative plate has a convex-concave or a coating formed thereon having a light scattering property.

Alternatively, the second insulative plate has a thickness of not greater than 0.7 mm, and a surface of the second insulative plate opposite to the transparent electrode side surface of the second insulative plate, has has a convex-concave or a sheet adhered thereon having a light scattering property.

In a modification, the reflecting surface of the reflector may have a convex-concave.

The convex-concave surface of the second insulative plate giving the light scattering property, can be formed, for example, by abrading or grinding the surface of the second insulative plate with abrasive powder, and further etching it with a hydrofluoric acid if necessary. On the other hand, the light scattering coating can be formed by a spin-coating. The light scattering sheet can be adhered to the insulative plate after the two insulative plates are assembled and a liquid crystal material is injected into a space formed between the two insulative plates. If the insulative plate mixed with particles having a refractive index different from that of the plate material, is used, the display can be completed only by assembling the two insulative plates and injecting the liquid crystal between the two insulative plates, without adhering the light scattering sheet.

As seen from the above, by scattering the light at the side of the insulative plate having the transparent electrode, the scattering property can be given with only a very simple process which needs no patterning, and further, the scattering property itself can be easily controlled. Accordingly, an easily visible paper-white image can be obtained.

In the reflective liquid crystal display formed as mentioned above, the surface of the reflector is a mirror surface, but the opposing plate having the transparent electrode, has the convex-concave surface, or the coating or the sheet having the light scattering property, or is formed of a plate mixed with particles having a different refractive index so as to scattering the light by action of a difference in the refractive index. In addition, since a light scattering causing portion is in contact with the transparent electrode for the liquid crystal material layer which produces an display image, or since the light scattering causing portion is formed on the transparent electrode through the intermediary of an extremely thin plate having a thickness of not greater than 0.7 mm, no fuzziness of the displayed image occurs. If the light scattering causing portion were formed on the transparent electrode through the intermediary of a plate having a thickness of not less than 1 mm, fuzziness of the displayed image becomes remarkable, and a recognition speed or legibility of a display character drops. Namely, the image quality is deteriorated.

Referring to FIG. 2, there is shown a graph illustrating a relation between a character reading time and a thickness of the opposing plate (between the light scattering causing portion and the transparent electrode). Since the reading time is different from one tester person to another, the reading time is standardized to "1" when the thickness of the opposing plate was 0.3 mm. In the reading test, Japanese "Kanji" characters " ▇ " and " ▇ ", which are similar to each other in appearance, were displayed, and a time was measured until each tester person answered what is the displayed character.

It could be noted from FIG. 2 that, if the thickness of the opposing plate exceeds 0.7 mm, the reading time, namely, the recognition time abruptly increases. In the case of scattering the light at the surface of the liquid crystal display, accordingly, it is important that the thickness of the opposing plate is maintained to be not greater than 0.7 mm.

Here, if the light scattering is made large at a side of the insulative plate having the transparent electrode, a backscattering becomes correspondingly large, and therefore, a brightness of a black display elevates, so that a contrast drops. However, this drop of contrast can be effectively suppressed by giving the light scattering property at a side of the insulative plate having the reflector, so that a reflective liquid crystal display having a sufficient light scattering property without dropping the contrast, can be obtained. In this case, even if the reflector were formed to have a convex-concave reflecting surface, a fine control of the shape of the convex-concave is not required, because the required light scattering property is given at the side of the insulating plate having the transparent electrode.

The above and other objects, features and advantages of the present invention will be apparent from the following description of preferred embodiments of the invention with reference to the accompanying drawings.

DESCRIPTION OF THE PREFERRED EMBODIMENTS

Figure 1:
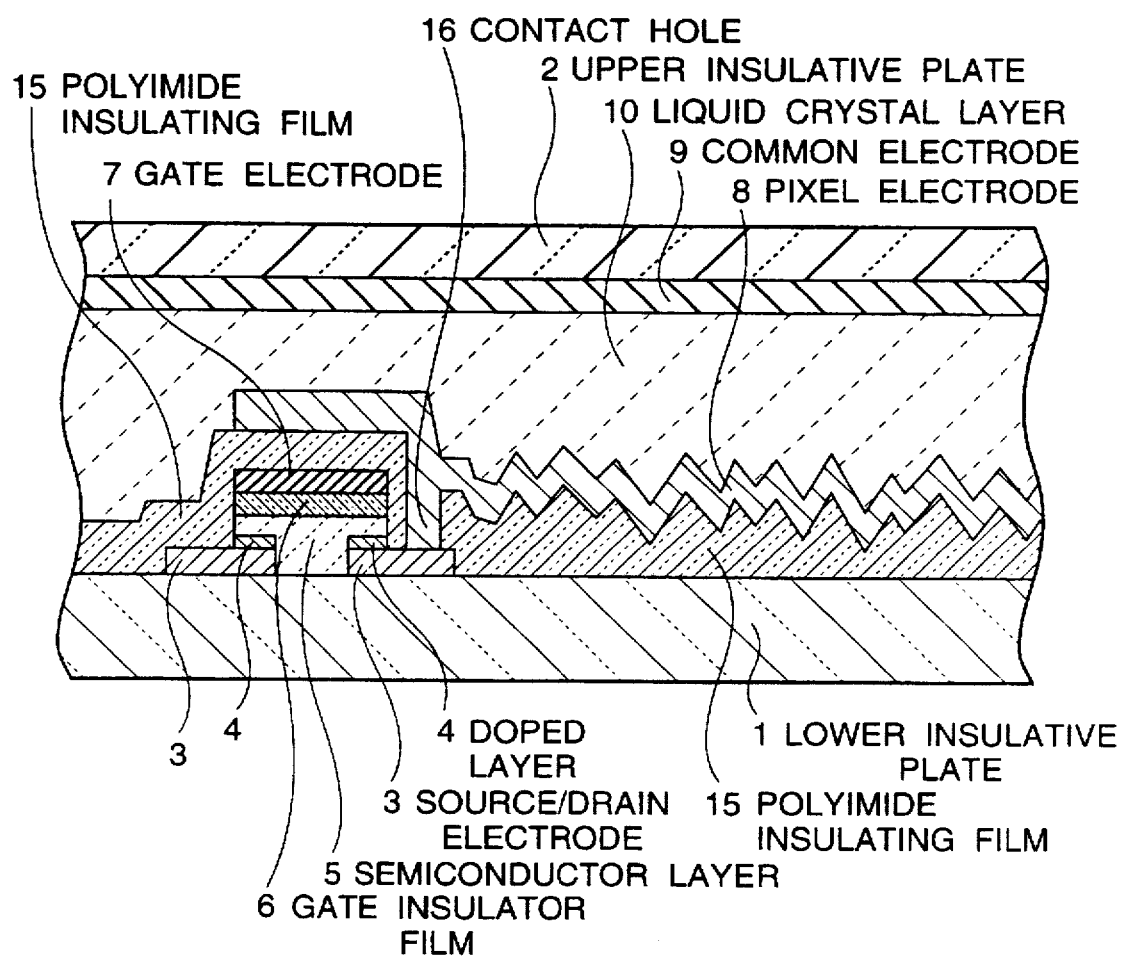
FIG. 1 is a diagrammatic sectional view of a conventional GH type reflective liquid crystal display.
Figure 2:
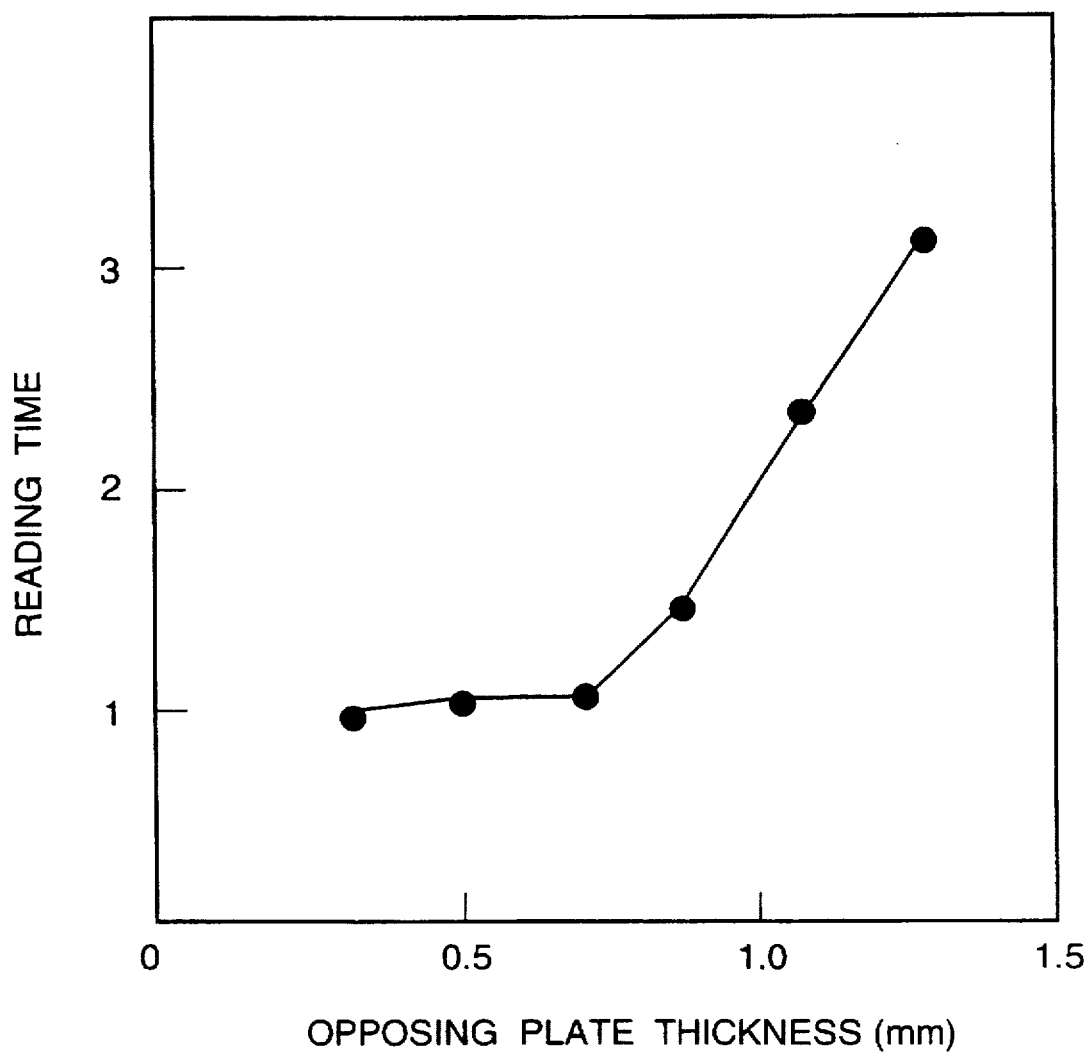
FIG. 2 is a graph illustrating a relation between a thickness of the opposing plate and a character reading time.

FIGS. 3 to 14 illustrate first to twelfth embodiments of the reflective liquid crystal display in accordance with the present invention, respectively.

Elements common to the first to twelfth embodiments of the reflective liquid crystal display are given the same Reference Numerals, and will be first described in the following.

As shown in FIGS. 3 to 14, on a lower insulative plate 1, there are formed a switching device for an active matrix drive and a pixel electrode 8 connected to the switching device. The shown switching device is a thin fill transistor (TFT) composed of a pair of source/drain electrodes 3 formed separately from each other on the insulative plate 1, a doped layer 4 formed on an inner side of each of the source/drain electrodes 3, a semiconductor layer 5 formed to cover the insulative plate 1 between the pair of source/drain electrodes 3 and each of the doped layer 4, a gate insulator film 6 formed on the semiconductor layer 5, and a gate electrode 7 formed on the gate insulator film 6.

On the other hand, the pixel electrode 8 is formed to cover the insulative plate 1 and a portion of one source/drain electrode 3 of the switching device so that the pixel electrode 8 is electrically connected to the one source/drain electrode 3. The pixel electrode 8 functions as a reflector.

On an upper insulative plate 2, a common electrode 9 which is a transparent electrode, is formed. The lower insulative plate 1 and the upper insulative plate 2 are assembled separated from each other in such a manner that the pixel electrode 8 opposes to the common electrode 9, and a liquid crystal material layer 10 is sandwiched between the lower insulative plate 1 and the upper insulative plate 2. An image is viewed from a side of the upper insulative plate 2.

EMBODIMENT 1

Figure 3:
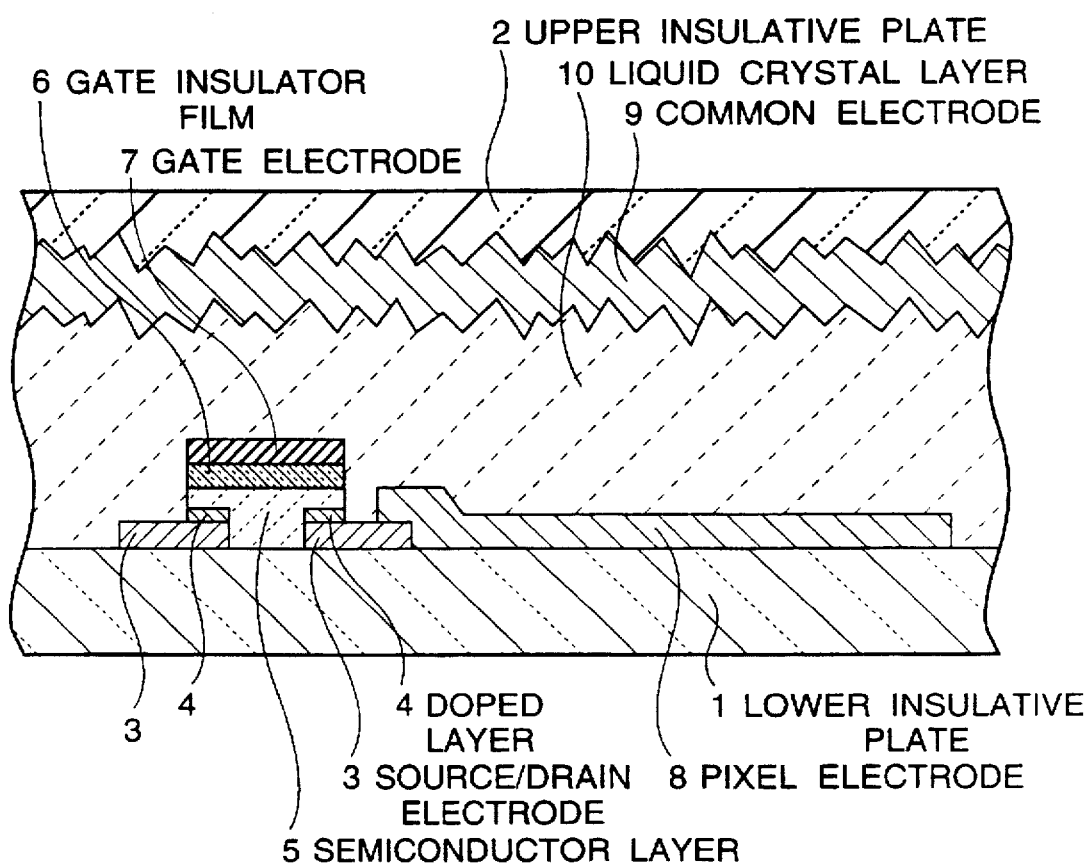
FIGS. 3 to 14 are diagrammatic sectional views of first to twelfth embodiments of the reflective liquid crystal display in accordance with the present invention, respectively.

Referring FIG. 3, there is shown a diagrammatic sectional view of a first embodiment of the reflective liquid crystal display in accordance with the present invention.

The lower insulative plate 1 having the pixel electrode 8 functioning as the reflector, is formed of a glass plate having a thickness of 1.1 mm, and the upper insulative plate 2 having the transparent common electrode 9 is also formed of a glass plate having a thickness of 1.1 mm, which, however, has an inner surface abraded with abrasive powder of 1000# so as to have a roughened surface, namely, a convex-concave surface.

On the lower insulative plate 1, a non-reverse staggered structure of thin film transistor is formed in the following process. First, a chromium metal film having a thickness of 100 nm is deposited on the lower insulative plate 1 by a sputtering, and then, patterned by a conventional photolithography so as to form source/drain electrodes 3 and signal interconnections.

Thereafter, the doped layer 4, the semiconductor layer 5 and the gate oxide film 6 are succeedingly deposited by a plasma CVD (chemical vapor deposition). In this process, the doped layer 4 is formed of an n-type amorphous silicon ($n^+$ a-Si) layer doped with phosphorus, having a thickness of 100 nm. The semiconductor layer 5 is formed of an amorphous silicon having a thickness of 100 nm. The gate oxide film 6 is formed by depositing a silicon oxide film having a thickness of 300 nm and a silicon nitride film having a thickness of 100 nm.

Furthermore, a chromium metal film having a thickness of 100 nm is deposited by a sputtering, as a gate electrode layer. Then, the chromium metal film is patterned to form the gate electrode 7 and a gate interconnection, and the doped layer 4, the semiconductor layer 5 and the gate oxide film 6 are succeedingly etched in the same pattern so as to form an island of a thin film transistor. Finally, an aluminum metal film having a thickness of 300 nm is deposited by a sputtering, and then, patterned to form the pixel electrode 8.

On the other hand, on a roughened surface of the upper insulative plate 2, an ITO (indium-tin-oxide) film having a thickness of 60 nm is deposited by a sputtering, and then, patterned to form the common electrode 9.

Thereafter, the lower insulative plate 1 and the upper insulative plate 2 are adhered to each other in such a manner that the pixel electrode 8 opposes to the common electrode 9. Here, an aligning treatment is previously carried out on each of the lower insulative plate 1 and the upper insulative plate 2. The lower insulative plate 1 and the upper insulative plate 2 are adhered to each other by inserting a spacer such as plastic particles therebetween, and by applying an epoxy type bonding agent at a periphery of a panel. Then, a GH type liquid crystal is injected into the space between the lower insulative plate 1 and the upper insulative plate 2, so as to form the liquid crystal layer 10. Thus, the reflective liquid crystal display panel is completed. Incidentally, the refractive index of the glass plate is 1.5, and on the other hand, the refractive index of the ITO film is 2.0 and the refractive index of the liquid crystal material is 1.7.

As a result, a monochrome reflective liquid crystal display panel was realized, which has a sufficient brightness in practice and which enables a white display comparable to a newspaper. A color reflective liquid crystal display panel having a sufficient brightness can be realized by providing a RGB color filter on the upper insulative plate.

EMBODIMENT 2

Figure 4:
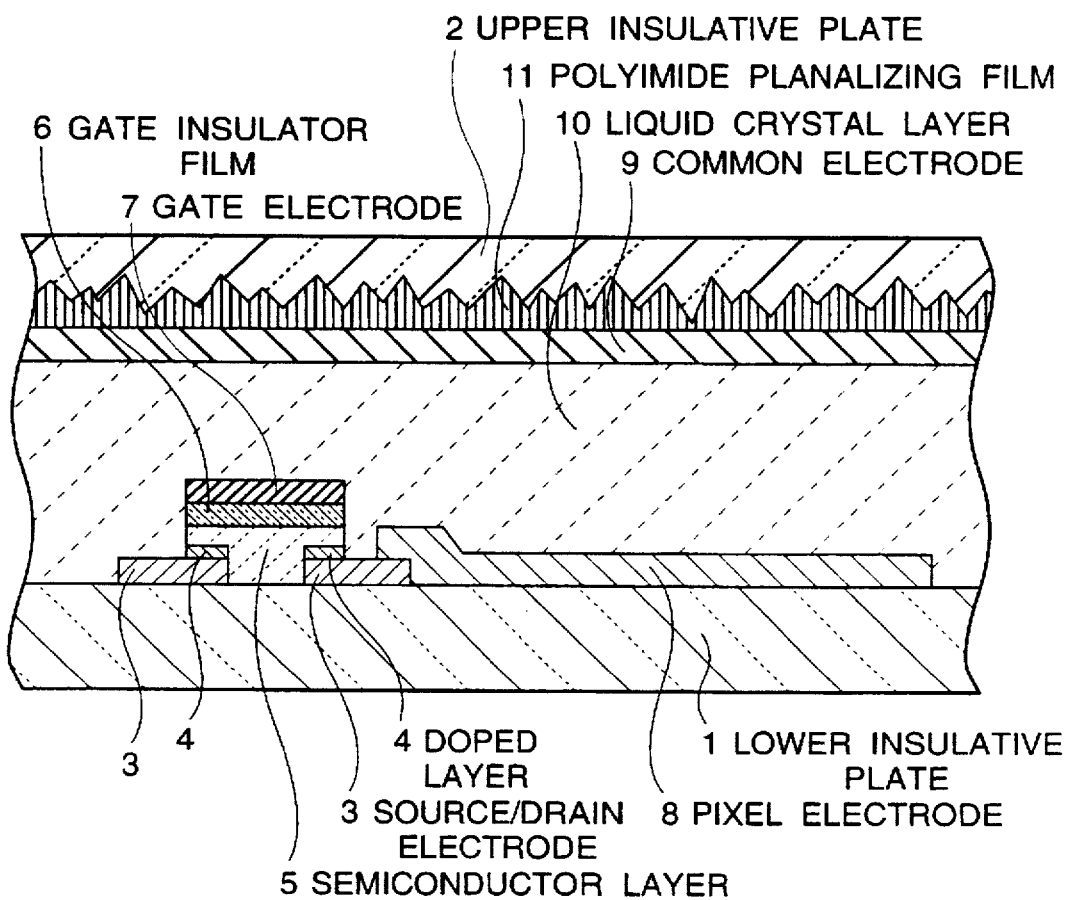

Referring FIG. 4, there is shown a diagrammatic sectional view of a second embodiment of the reflective liquid crystal display in accordance with the present invention.

The second embodiment was formed similarly to the first embodiment, excluding the following: A polyimide film having a thickness of 1 µm is deposited on the roughened surface of the upper insulative panel 2 by a spin coating, and then, is annealed at a temperature of 250° C. for one hour so as to form a planarized polyimide film 11. The ITO film is deposited on the planarized surface of the polyimide film 11 by a sputtering.

By depositing and planarizing the polyimide having the refractive index on the order of 2, it is possible to enhance the light scattering at the roughened surface of the glass plate.

EMBODIMENT 3

Figure 5:
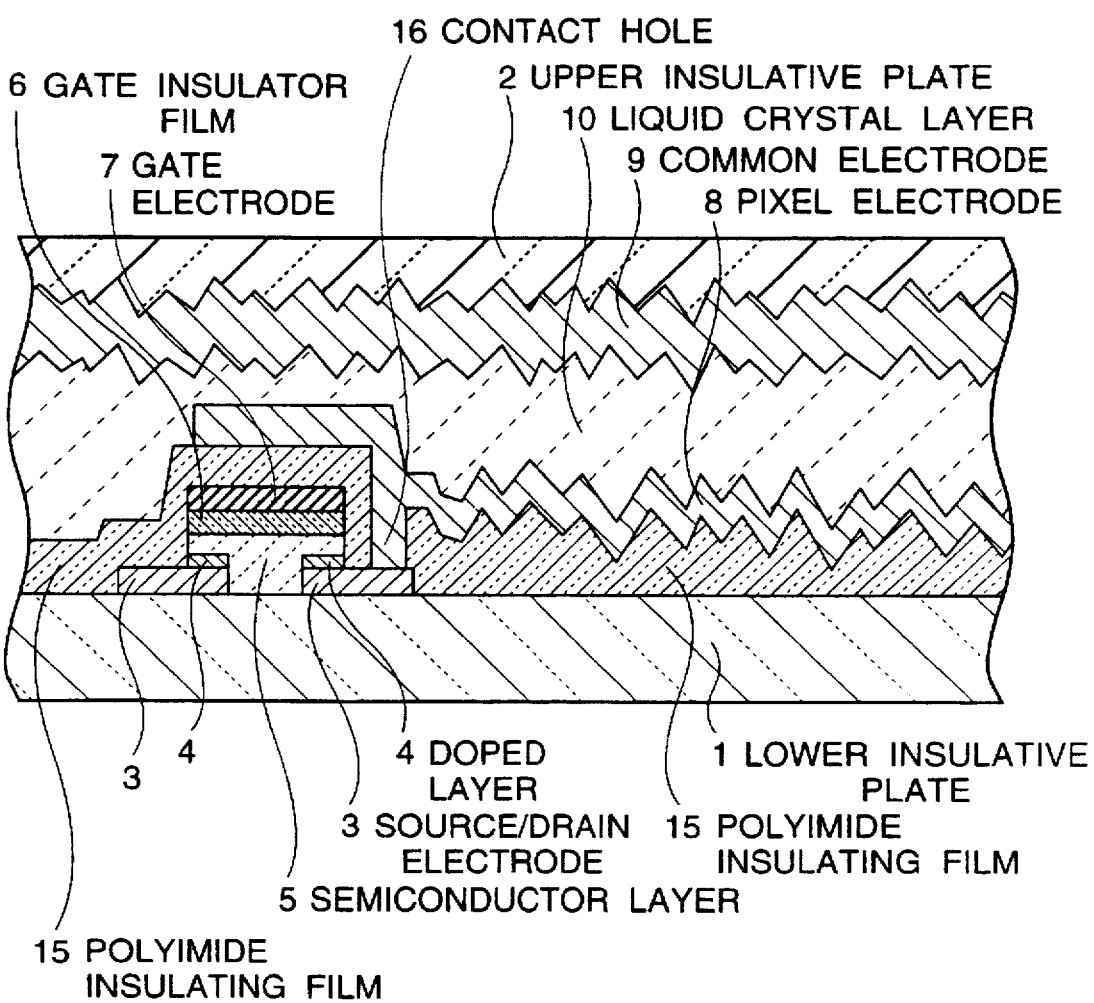

Referring FIG. 5, there is shown a diagrammatic sectional view of a third embodiment of the reflective liquid crystal display in accordance with the present invention.

On a lower insulative plate 1, a switching device similar to that of the first embodiment is formed, and then, a polyimide insulating film 15 having a convex-concave surface is formed to cover the switching device and the lower insulative plate 1. A pixel electrode 8 functioning as the reflector is formed on the polyimide insulating film 15 so that a surface of the pixel electrode 8 has a corresponding convex-concave.

The lower insulative plate 1 having the reflector, is formed of a glass plate having a thickness of 1.1 mm, and the upper insulative plate 2 having the transparent common electrode is also formed of a glass plate having a thickness of 1.1 mm, which, however, has an inner surface abraded with abrasive powder of 1000# so as to have a roughened surface, namely, a convex-concave surface.

On the lower insulative plate 1, a non-reverse staggered structure of thin film transistor is formed in a process similar to that of the first embodiment. On the other hand, a polyimide film is deposited to have a thickness of about 2 µm on the thin film transistor by a spin coating, and preliminarily baked at a temperature of 180° C. for one hour. Furthermore, a photoresist process is carried out to cover only the polyimide film on the thin film transistor, and an etching is performed to form a convex-concave on the polyimide film covering the lower insulative plate 1. Then, a contact hole 16 is formed through the polyimide film by a conventional photoresist process, in order to interconnect a possible pixel electrode and the thin film transistor. Further, a finishing baking is carried out at a temperature of 250° C. for one hour. An aluminum metal film having a thickness of 300 nm is deposited by a sputtering, and then, patterned to form the pixel electrode 8. Finally, peripheral terminals are formed by a conventional patterning process.

On the other hand, on a roughened surface of the upper insulative plate 2, an ITO film having a thickness of 60 nm is deposited by a sputtering, and then, patterned to form the common electrode 9.

Thereafter, the lower insulative plate 1 and the upper insulative plate 2 are adhered to each other in such a manner that the pixel electrode 8 opposes to the common electrode 9. Here, an aligning treatment is previously carried out on each of the lower insulative plate 1 and the upper insulative plate 2. The lower insulative plate 1 and the upper insulative plate 2 are adhered to each other by inserting a spacer such as plastic particles therebetween, and by applying an epoxy type bonding agent at a periphery of a panel. Then, a GH type liquid crystal is injected into the space between the lower insulative plate 1 and the upper insulative plate 2, so as to form the liquid crystal layer 10. Thus, the reflective liquid crystal display panel is completed. Incidentally, the refractive index of the glass plate is 1.5, and on the other hand, the refractive index of the ITO film is 2.0 and the refractive index of the liquid crystal material is 1.7.

As a result, a monochrome reflective liquid crystal display panel was realized, which has a sufficient brightness in practice and which enables a white display comparable to a newspaper. A color reflective liquid crystal display panel having a sufficient brightness can be realized by providing a RGB color filter on the upper insulative plate.

Furthermore, a contrast was improved as compared with the first embodiment.

EMBODIMENT 4

Figure 6:
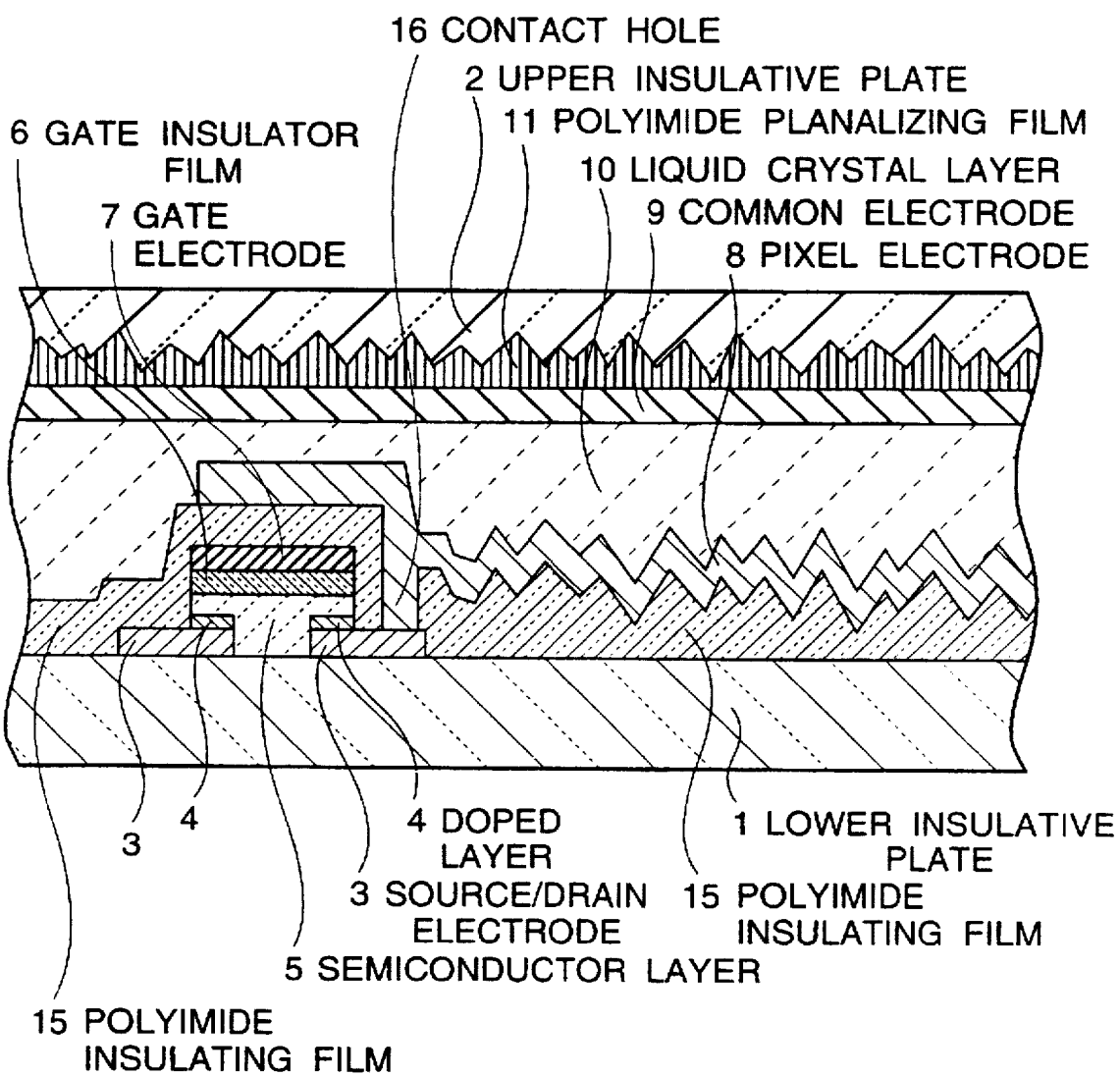

Referring FIG. 6, there is shown a diagrammatic sectional view of a fourth embodiment of the reflective liquid crystal display in accordance with the present invention.

The fourth embodiment was formed similarly to the third embodiment, excluding the following: A polyimide film having a thickness of 1 μm is deposited on th roughened surface of the upper insulative panel 2 by a spin coating, and then, is annealed at a temperature of 250° C. for one hour so as to form a planarized polyimide film 11. The ITO film is deposited on the planarized surface of the polyimide film 11 by a sputtering.

By depositing and planarizing the polyimide having the refractive index on the order of 2, it is possible to enhance the light scattering at the roughened surface of the glass plate.

EMBODIMENT 5

Figure 7:
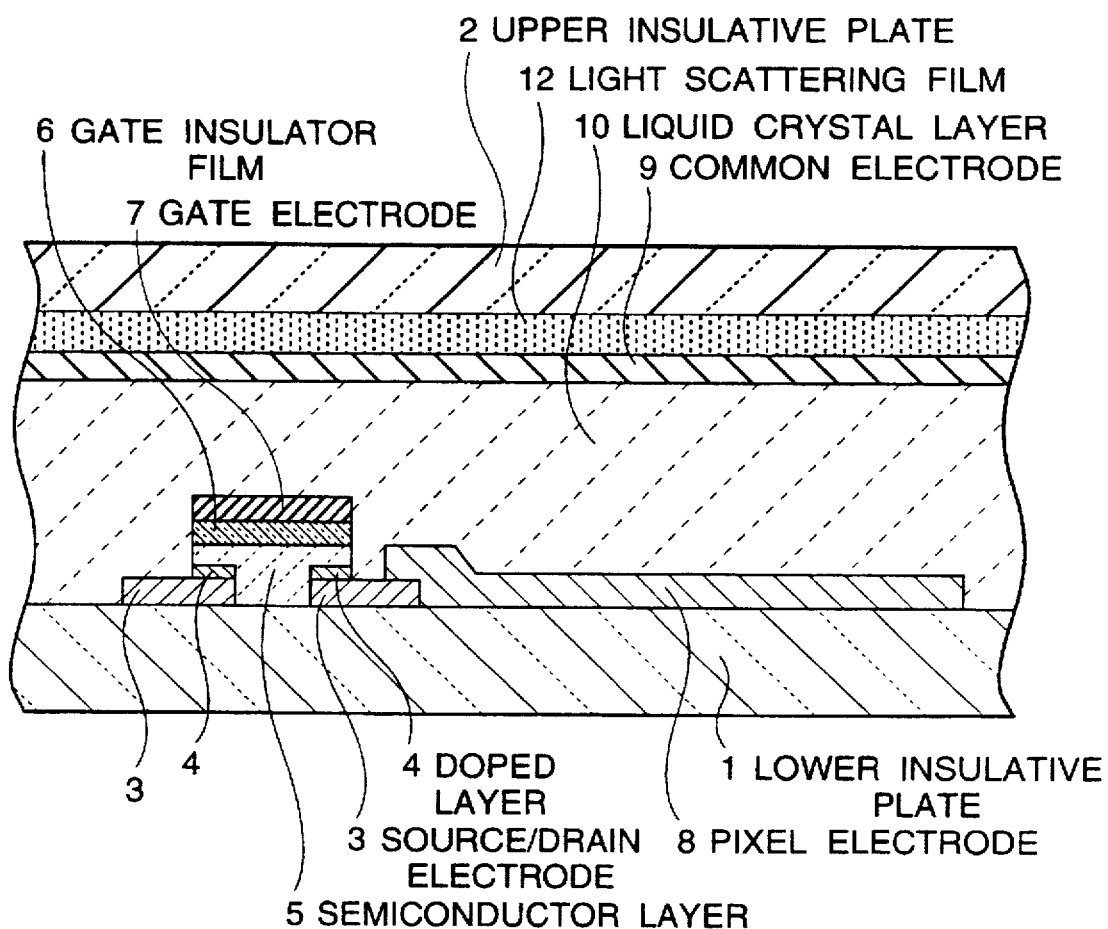

Referring FIG. 7, there is shown a diagrammatic sectional view of a fifth embodiment of the reflective liquid crystal display in accordance with the present invention.

The fifth embodiment is characterized in that a light scattering film 12 is provided between the upper insulative plate 2 and the common electrode 9.

Each of the lower insulative plate 1 having the reflector and the upper insulative plate 2 having the transparent common electrode is formed of a glass plate having a thickness of 1.1 mm.

On the lower insulative plate 1, the thin film transistor and the pixel electrode 8 are formed, completely similarly to the first embodiment.

On the upper insulative plate 2, the light scattering film 12 is formed by depositing a paint vehicle containing a titanium oxide with a thickness of 1 μm to 2 μm, and then by baking it within an oven at a temperature of 90° C. Thereafter, an ITO film having a thickness of 60 nm is deposited on the light scattering film 12 by a sputtering, and then, patterned to form a common electrode 9.

Similarly to the first embodiment, the insulative plates 1 and 2 are adhered and a liquid crystal material is injected into a space formed between the insulative plates 1 and 2. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 6

Figure 8:
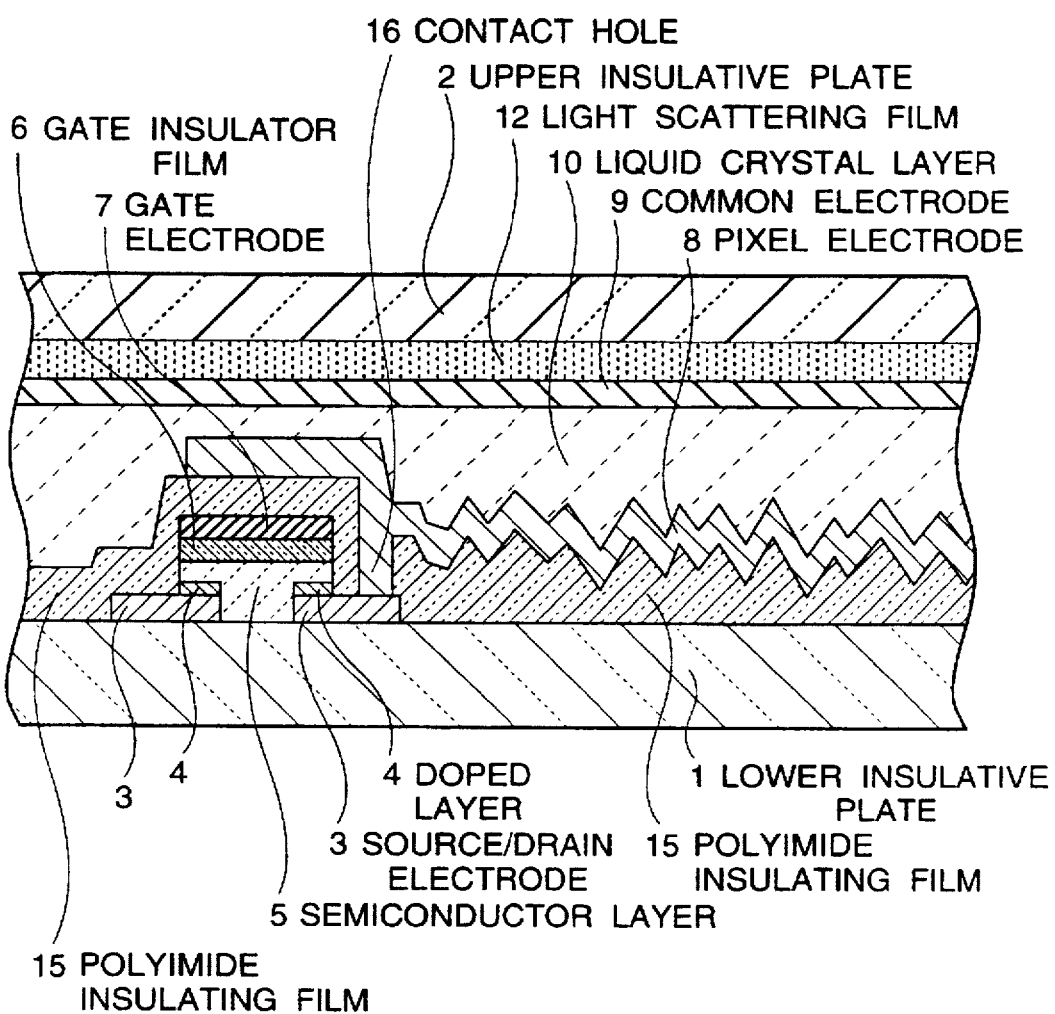

Referring FIG. 8, there is shown a diagrammatic sectional view of a sixth embodiment of the reflective liquid crystal display in accordance with the present invention.

Each of the lower insulative plate 1 having the reflector and the upper insulative plate 2 having the transparent common electrode is formed of a glass plate having a thickness of 1.1 mm.

On the lower insulative plate 1, the thin film transistor, the pixel electrode 8 and the polyimide insulating film 15 having a convex-concave surface are formed, similarly to the third embodiment.

On the upper insulative plate 2, the light scattering film 12 is formed by depositing a paint vehicle containing a titanium oxide with a thickness of 1 μm to 2 μm, and then by baking it within an oven at a temperature of 90° C. Thereafter, an ITO film having a thickness of 60 nm is deposited on the light scattering film 12 by a sputtering, and then, patterned to form a common electrode 9.

Similarly to the third embodiment, the insulative plates 1 and 2 are adhered and a liquid crystal material is injected into a space formed between the insulative plates 1 and 2. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 7

Figure 9:
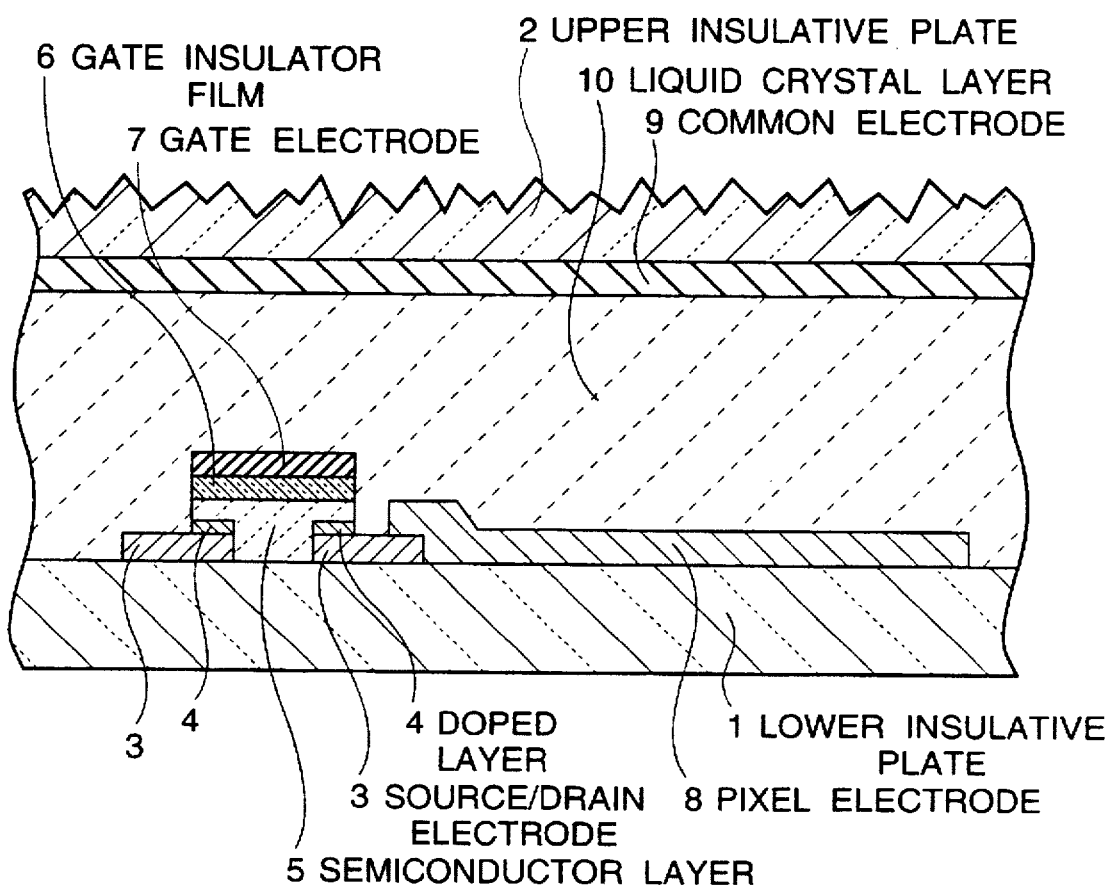

Referring FIG. 9, there is shown a diagrammatic sectional view of a seventh embodiment of the reflective liquid crystal display in accordance with the present invention.

The lower insulative plate 1 having the reflector, is formed of a glass plate having a thickness of 1.1 mm, and the upper insulative plate 2 having the transparent common electrode is formed of a glass plate having a thickness of 0.7 mm, which has an outer surface abraded with abrasive powder of 1000# so as to have a roughened outer surface, namely, a convex-concave outer surface.

On the lower insulative plate 1, the thin film transistor and the pixel electrode 8 are formed, completely similarly to the first embodiment.

On an inner surface of the upper insulative plate 2, an ITO film having a thickness of 60 nm is deposited by a sputtering, and then, patterned to form a common electrode 9.

Similarly to the first embodiment, the insulative plates 1 and 2 are adhered and a liquid crystal material is injected into a space formed between the insulative plates 1 and 2. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 8

Figure 10:
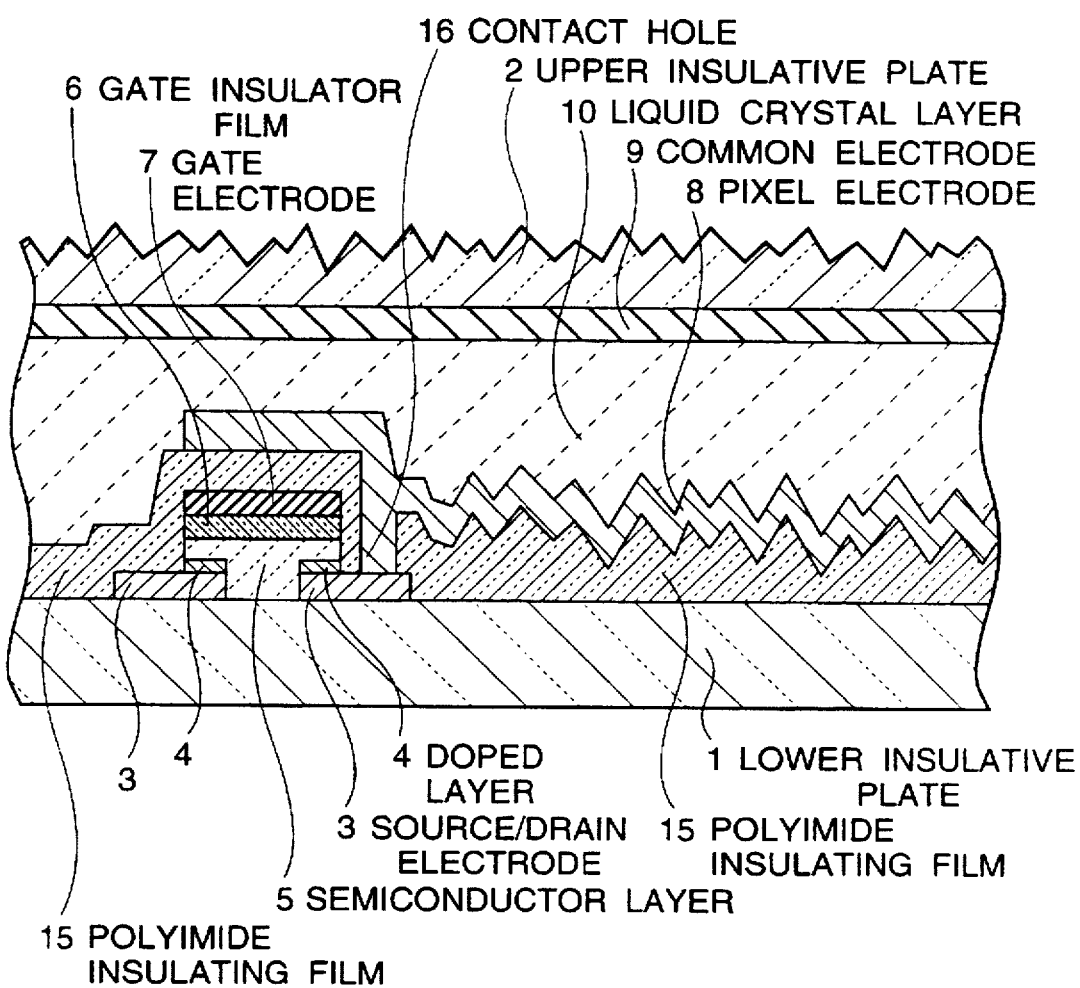

Referring FIG. 10, there is shown a diagrammatic sectional view of an eighth embodiment of the reflective liquid crystal display in accordance with the present invention.

The lower insulative plate 1 having the reflector, is formed of a glass plate having a thickness of 1.1 mm, and the upper insulative plate 2 having the transparent common electrode is formed of a glass plate having a thickness of 0.7 mm, which has an outer surface abraded with abrasive powder of 1000# so as to have a roughened outer surface, namely, a convex-concave outer surface.

On the lower insulative plate 1, the thin film transistor, the pixel electrode 8 and the polyimide insulating film 15 having a convex-concave surface are formed, similarly to the third embodiment.

On an inner surface of the upper insulative plate 2, an ITO film having a thickness of 60 nm is deposited by a sputtering, and then, patterned to form a common electrode 9.

Similarly to the third embodiment, the insulative plates 1 and 2 are adhered and a liquid crystal material is injected into a space formed between the insulative plates 1 and 2. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 9

Figure 11:
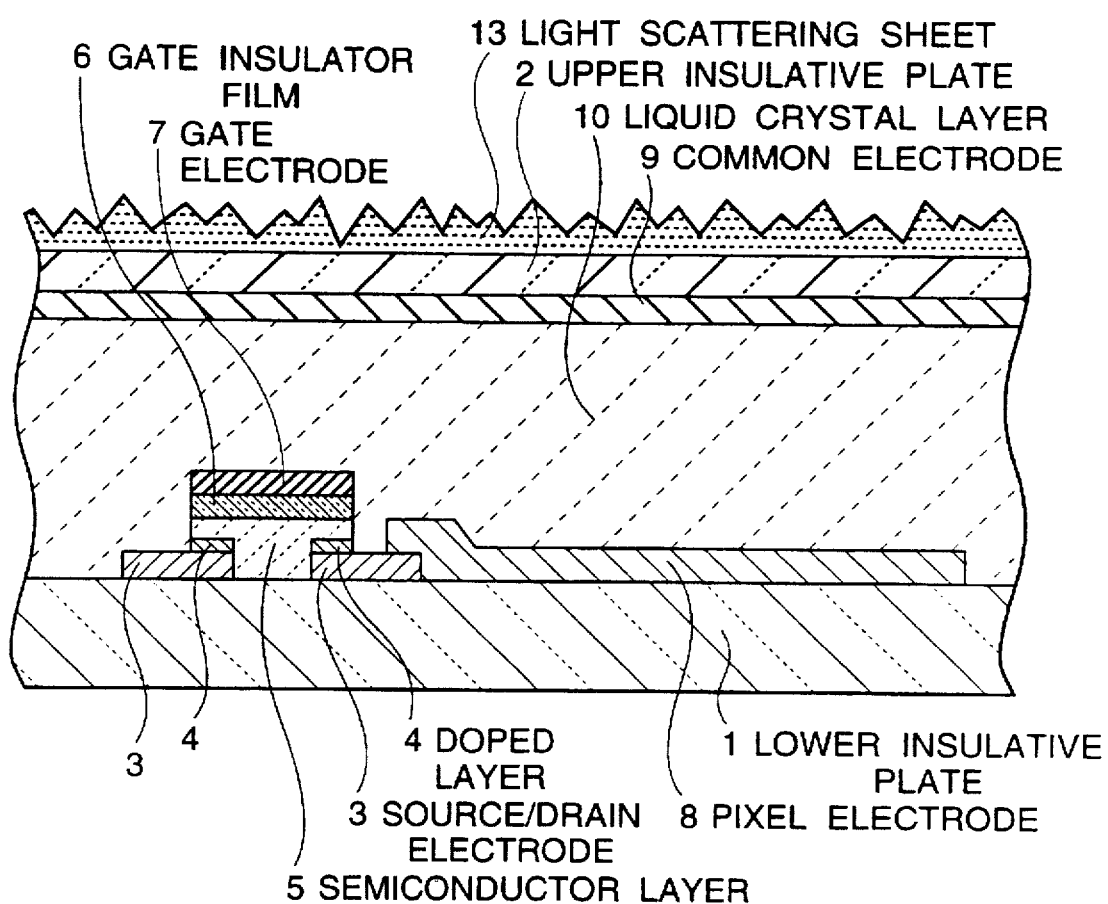

Referring FIG. 11, there is shown a diagrammatic sectional view of a ninth embodiment of the reflective liquid crystal display in accordance with the present invention.

The ninth embodiment is characterized in that a light scattering sheet 13 is adhered on an outer surface of the upper insulative plate 2.

The lower insulative plate 1 having the reflector, is formed of a glass plate having a thickness of 1.1 mm, and the upper insulative plate 2 having the transparent common electrode is formed of a glass plate having a thickness of 0.7 mm.

On the lower insulative plate 1, the thin film transistor and the pixel electrode 8 are formed, similarly to the first embodiment. On the upper insulative plate 2, an ITO film having a thickness of 60 nm is deposited by a sputtering, and then, patterned to form a common electrode 9. In addition, similarly to the first embodiment, the insulative plates 1 and 2 are adhered and a liquid crystal material is injected into a space formed between the insulative plates 1 and 2. Thereafter, an injection port is closed. Thus, the reflective liquid crystal display panel was completed.

Furthermore, the light scattering sheet 13, which is conventionally used in a backlight of a transparent type liquid crystal display, is adhered on an outer surface of the upper insulative plate 2 of the reflective liquid crystal display panel thus formed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 10

Figure 12:
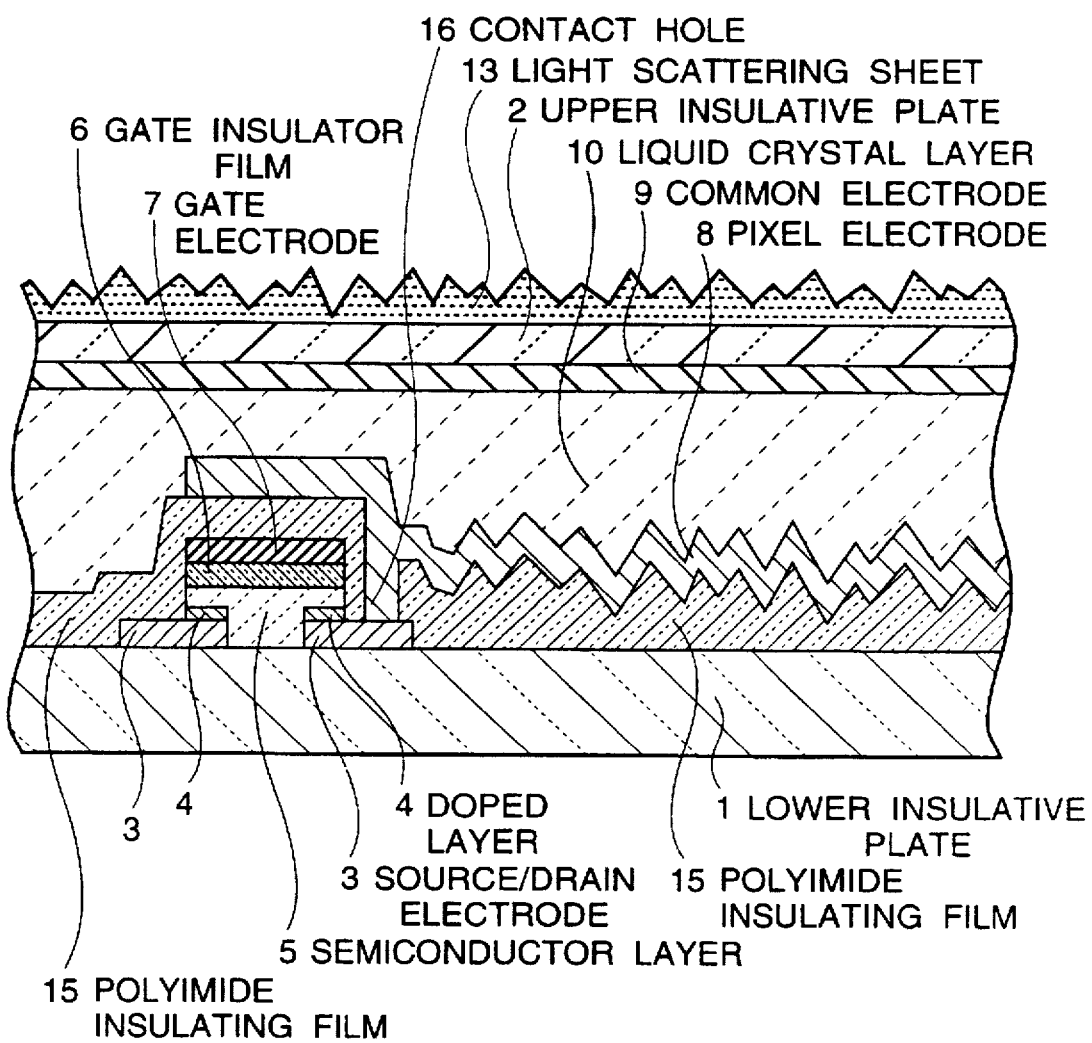

Referring FIG. 12, there is shown a diagrammatic sectional view of a tenth embodiment of the reflective liquid crystal display in accordance with the present invention.

The lower insulative plate 1 having the reflector, is formed of a glass plate having a thickness of 1.1 mm, and the upper insulative plate 2 having the transparent common electrode is formed of a glass plate having a thickness of 0.7 mm.

On the lower insulative plate 1, the thin film transistor, the pixel electrode 8 and the polyimide insulating film 15 having a convex-concave surface are formed, similarly to the third embodiment. On the upper insulative plate 2, an ITO film having a thickness of 60 nm is deposited by a sputtering, and then, patterned to form a common electrode 9. In addition, similarly to the third embodiment, the insulative plates 1 and 2 are adhered and a liquid crystal material is injected into a space formed between the insulative plates 1 and 2. Thereafter, an injection port is closed. Thus, the reflective liquid crystal display panel was completed.

Furthermore, the light scattering sheet 13, which is conventionally used in a backlight of a transparent type liquid crystal display, is adhered on an outer surface of the upper insulative plate 2 of the reflective liquid crystal display panel thus formed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 11

Figure 13:
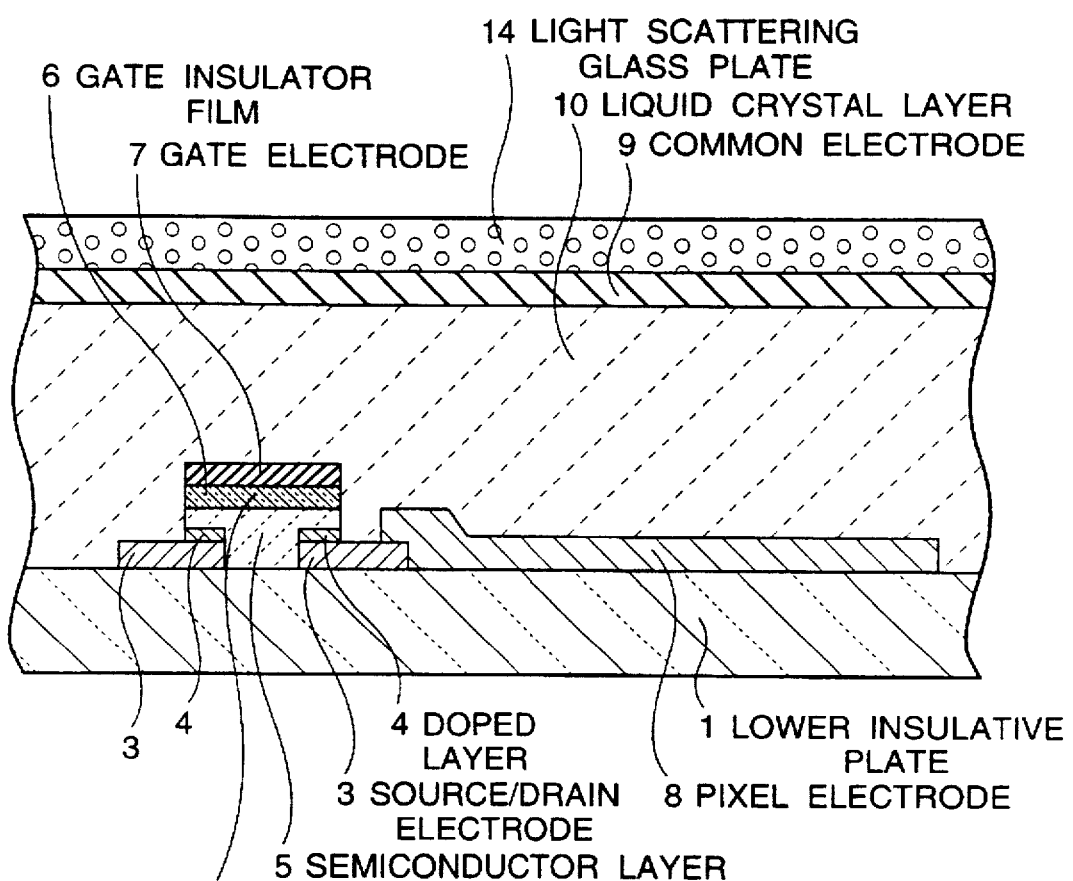

Referring FIG. 13, there is shown a diagrammatic sectional view of an eleventh embodiment of the reflective liquid crystal display in accordance with the present invention.

The eleventh embodiment is characterized in that the upper insulative plate is formed of a light scattering glass plate 14.

The lower insulative plate 1 having the reflector, is formed of a glass plate having a thickness of 1.1 mm, and the upper insulative plate having the transparent common electrode is formed of a light scattering glass plate having a thickness of 0.7 mm, which is mixed with 4 weight % of a polymer having a refractive index of 2.0. For example, this light scattering glass plate 14 can be formed by impregnating a porous glass plate with a polymer.

On the lower insulative plate 1, the thin film transistor and the pixel electrode 8 are formed, completely similarly to the first embodiment. On the upper insulative plate 2, an ITO film having a thickness of 60 nm is deposited by a sputtering, and then, patterned to form a common electrode 9.

In addition, similarly to the first embodiment, the insulative plates are adhered and a liquid crystal material is injected into a space formed between the insulative plates. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

EMBODIMENT 12

Figure 14:
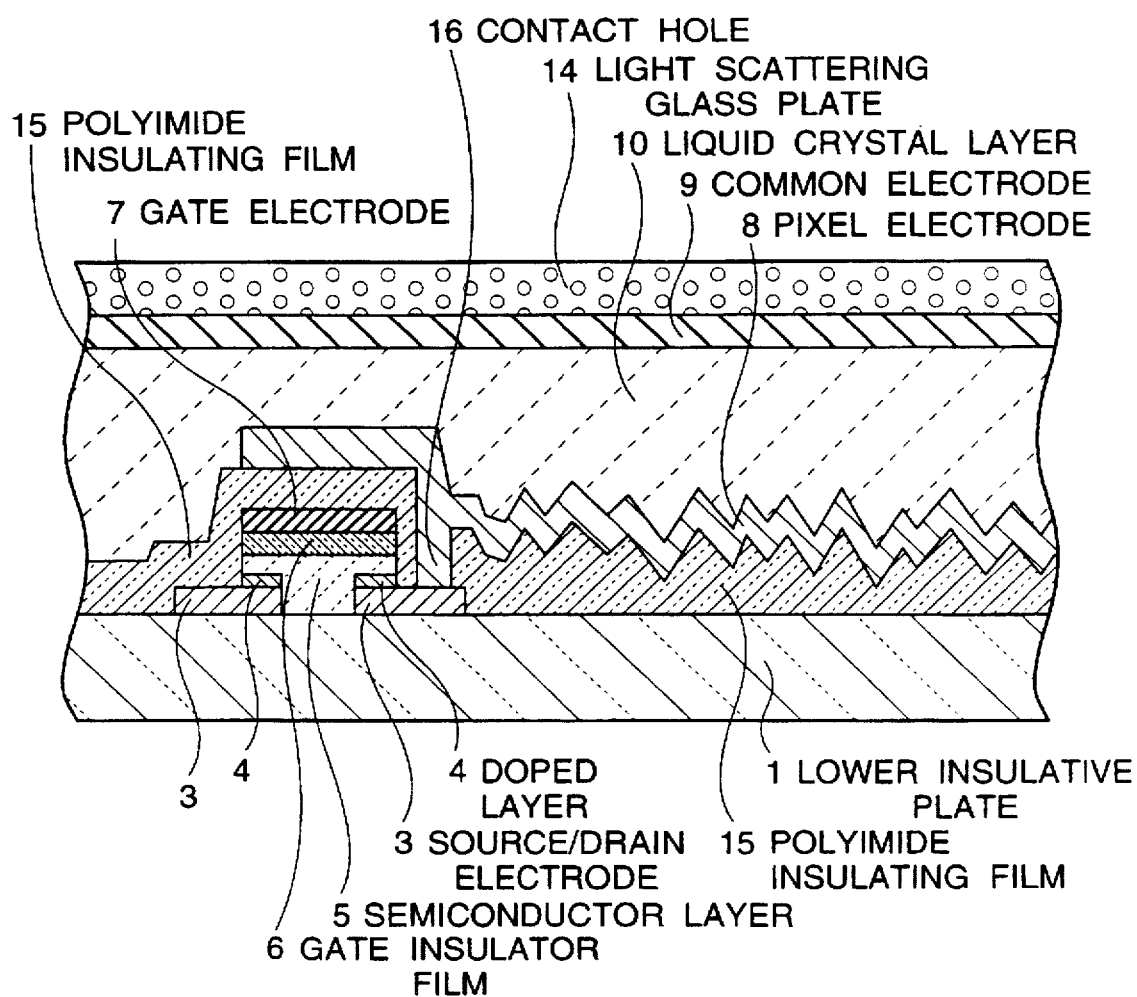

Referring FIG. 14, there is shown a diagrammatic sectional view of a twelfth embodiment of the reflective liquid crystal display in accordance with the present invention.

The lower insulative plate 1 having the reflector, is formed of a glass plate having a thickness of 1.1 mm, and the upper insulative plate having the transparent common electrode is formed of a light scattering glass plate having a thickness of 0.7 mm, which is mixed with 4 weight % of a polymer having a refractive index of 2.0.

On the lower insulative plate 1, the tin film transistor, the pixel electrode 8 and the polyimide insulating film 15 having a convex-concave surface are formed, similarly to the third embodiment. On the upper insulative plate 2, an ITO film having a thickness of 60 nm is deposited by a sputtering, and then, patterned to form a common electrode 9.

In addition, similarly to the third embodiment, the insulative plates are adhered and a liquid crystal material is injected into a space formed between the insulative plates. Thereafter, an injection port is closed. Thus, the reflective liquid crystal display panel was completed.

As a result, a monochrome reflective liquid crystal display panel having a sufficient brightness in practice and a white display comparable to a newspaper, was realized with a low cost. A color reflective liquid crystal display panel having a sufficient brightness can be realized by providing a RGB color filter on the upper insulative plate.

As seen from the above, according to the present invention, there is provided a reflective liquid crystal display which has a sufficient light scattering characteristics enabling a while display of a paper white and which can be manufactured in a process simpler than that for the conventional one.

The invention has thus been shown and described with reference to the specific embodiments. However, it should be noted that the present invention is in no way limited to the details of the illustrated structures but changes and modifications may be made within the scope of the appended claims.

We claim:

1. A reflective liquid crystal display comprising a first insulative plate having a reflector, a second insulative plate having a transparent electrode, said first and second insulative plates being assembled in such a manner that said reflector opposes to said transparent electrode, separately from each other, and a liquid crystal layer sandwiched between said reflector and said transparent electrode, wherein said reflector has a convex-concave reflecting surface, and a light scattering means is provided at said second insulative plate, wherein said light scattering means comprises a convex-concave surface formed on a transparent electrode side surface of said second insulative plate.

2. A reflective liquid crystal display claimed in claim 1 wherein said transparent electrode is formed on said convex-concave surface of said second insulative plate.

3. A reflective liquid crystal display claimed in claim 2 wherein said convex-concave surface of said second insulative plate is covered with a planarizing film, and said transparent electrode is formed on said planarizing film.

4. A reflective liquid crystal display comprising a first insulative plate having a reflector, a second insulative plate having a transparent electrode, said first and second insulative plates being assembled in such a manner that said reflector opposes said transparent electrode, separately from each other, and a liquid crystal layer sandwiched between said reflector and said transparent electrode, wherein said reflector has a convex-concave reflecting surface, and a light scattering means is provided at said second insulative plate, wherein said scattering means comprises a light scattering film coated on a transparent electrode side surface of said second insulative plate, and said transparent electrode is formed on said light scattering film.

* * * * *